(No Model.)

W. E. CAYLOR.
NUT LOCK.

No. 599,385. Patented Feb. 22, 1898.

Witnesses:
Thomas B. McGregor.
Little S. Itter.

Inventor:
Worth E. Caylor
By Banning & Banning & Sheridan
Attys.

UNITED STATES PATENT OFFICE.

WORTH E. CAYLOR, OF CHICAGO, ILLINOIS.

NUT-LOCK.

SPECIFICATION forming part of Letters Patent No. 599,385, dated February 22, 1898.

Application filed October 6, 1897. Serial No. 654,269. (No model.)

*To all whom it may concern:*

Be it known that I, WORTH E. CAYLOR, a citizen of the United States, residing at Chicago, Illinois, have invented certain new and useful Improvements in Nut-Locks, of which the following is a specification.

The object of my invention is to make a lock to prevent the nuts on bolts used in different kinds of machinery from becoming loosened or coming off in use, as will occur unless some special means be employed to prevent, and which is also applicable to prevent a wheel, pulley, cone of a ball-bearing, or other member arranged on a shaft from turning; and my invention consists in the features and details of construction hereinafter described and claimed.

Figure 1:
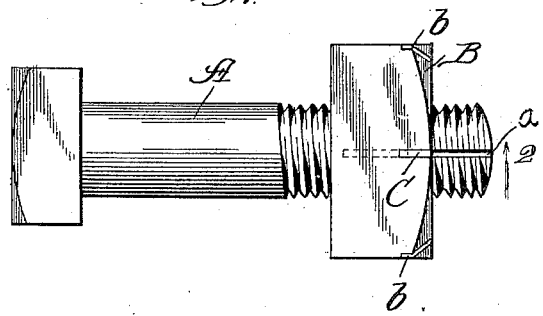
Figure 2:
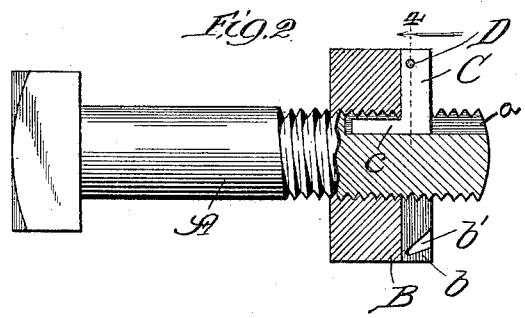
Figure 3:
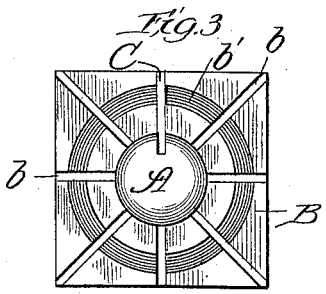
Figure 4:
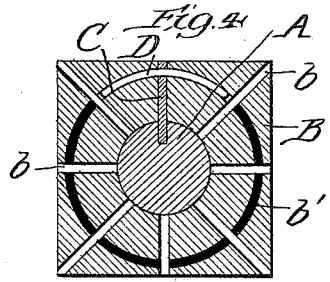
Figure 5:
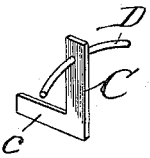

In the drawings, Figure 1 is a side elevation of a bolt and nut provided with my improved lock; Fig. 2, a side elevation of the same, with the nut portion shown in section, taken on line 2 of Fig. 1, looking in the direction of the arrow; Fig. 3, an end elevation of the bolt and nut; Fig. 4, an end elevation of a transverse section, taken on line 4 of Fig. 2, looking in the direction of the arrow; Fig. 5, a perspective view of the locking-key spring; and Fig. 6, an end elevation showing the application of my invention to wheels, pulleys, or similar devices mounted on the shaft.

For convenience I have described my invention in its application to bolts and nuts to lock the nut on a bolt, though, as above intimated, I do not intend to limit myself simply to this use or application of the invention.

In making my improved nut-lock I take a bolt A, which may be made of the ordinary construction and provided with screw-threads at one end to receive a nut in the usual way. I provide a bolt at its threaded end with one or more slots $a$, as it is obvious that any desired number may be employed. I have shown the slot in the form of a longitudinal groove extending part of the way into the bolt, although, if desired, it may be extended entirely across the bolt and be of a desired depth. I make a nut B, which may be of the ordinary construction and provided with screw-threads to adapt it to be screwed onto the threaded portion of the bolt in the usual way. I provide this nut with a number of radial grooves $b$, which may be cut to a desired depth into the face of the nut, and any desired number of them may be employed. If desired, the nut may be made of greater thickness to compensate for any weakness that may be caused by providing it with these radial grooves; but of course this is a matter of construction to which I do not attach any importance so far as my invention is concerned. I provide the face of the nut also with a circular groove $b'$. When I speak of this groove being "circular," I do not mean to require it to be a true circle, as the benefit and utility of this groove do not depend upon its being circular. This groove may be extended entirely around the face of the nut, as shown in the drawings, or it may be simply made as the arc of a circle, or, if preferred, several grooves, each substantially in the arc of a circle, may be made in the face of the nut, or, if preferred, several substantially straight grooves may be employed. In all cases, however, the groove $b'$ must intersect or cross the radial grooves in the face of the nut. I prefer, however, as a matter of convenience in construction to make the groove $b'$ as a circumferential groove extending entirely around, as shown in the drawings. I also prefer to have this circumferential groove inclined outwardly as it extends inwardly into the face of the nut, as shown in Fig. 2, as in this form it will, I think, better subserve the purpose for which it is intended; but as to this the groove $b$ may be made in the face of the nut, as convenience or preference on the part of the constructor may make desirable. I make a locking-key C of a piece of metal, preferably sheet-steel, adapted to be received in the longitudinal slot in the bolt and one of the radial grooves in the nut. To permit its reception into this groove, the nut must of course be turned to a position where the slot in the bolt and one of the grooves in the nut will register, as shown in the drawings. The key is then placed in position so that its inner end rests in the slot in the bolt and its outer end in the radial groove in the nut in which it may be arranged, so that the nut cannot be turned on the bolt while it is in place. I prefer also to provide the key with an extending leg or portion $c$, which is intended to fit down into the slot in the bolt beyond the groove in the nut. The object of this extending leg or portion is to more securely retain the key in place and to adapt the lock to those cases where the nut is only screwed partially on the bolt, as there may be occasions where, owing to the shortness of the bolt, a nut cannot be screwed entirely on. In such cases the depth of the radial groove in the nut might be insufficient to cause it to register with the slot in the bolt, and by providing the extending leg or portion running in the lock is made practical and operative for such cases. This extending portion running down into the slot in the bolt will, as already intimated, tend to prevent the removal of the key in a direct movement along the radial groove in the nut and require it to be lifted out before it can be removed. I provide the key with a spring D, (shown particularly in Fig. 5,) which may be extended out on both sides of the key, as shown, or only on one side, as preferred, or as the exigencies of use may render advisable. This spring is preferably made of spring-wire, either round or flat, as desired, but possessed of sufficient resiliency to enable it to perform the office intended for it. When the nut has been secured onto the bolt and turned into the desired position, so that one of its radial grooves registers with the slot in the threaded portion of the bolt, the key is slipped into place and the spring sprung into the groove $b'$, crossing the radial groove in which the key is arranged, where it will rest and bear against the outer side of the groove $b'$. I have shown the spring as when extended a part of the way around in the circular groove in the face of the nut, though it is obvious that it may be made and used long enough to extend entirely around when sprung into place in the circular groove. If the circular groove be made inclined, as shown in Fig. 2, the more difficult will the removal of the spring from the circular groove be rendered. Of course it will be understood that in all cases, whether the groove $b'$ be made circular or partially circular or simply crossing the radial groove in the face of the nut, the spring is intended to be sprung in, so as to bear against the outer side of the groove to prevent it from being jarred or shaken out in use and so that it will be retained in place by its resiliency and the friction between it and the outer edge of the groove $b'$. At the same time the nut may be unlocked by simply springing the spring D out of the groove in the face of the nut and removing the key without in any way destroying or injuring any of the parts.

Figure 6:
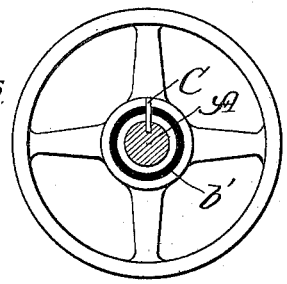

In Fig. 6 I have shown another use to which my invention is applicable. In this case I have shown a member, as a pulley on a shaft, which it is desired to prevent from turning. Where my invention is used to prevent the wheel, pulley, cone of a ball-bearing, or other member mounted on a shaft from turning, the wheel, pulley, cone, or other member need only be provided with one radial groove, as it may be adjusted in position to make such groove register with the longitudinal slot in the shaft. The key is inserted precisely as in the case of the bolt and nut, and the spring holds the key in position and locks the shaft and the member mounted on it just as it does in the case of a bolt and nut.

I have explained the applicability of my invention to a shaft and member mounted on it—as a wheel, pulley, cone of a ball-bearing, or other member—simply to show that my invention is not confined solely to bolts and nuts and so that no inference can be drawn against me in favor of a narrow or restricted construction of my invention or the claims in which I specify it. I may also say that in using the terms "shaft" and "bolt" in the specification and claims I do so in very broad signification and as the equivalents of each other, as I regard a bolt on which a nut is placed as, in a broad sense, nothing more than a shaft.

What I regard as new, and desire to secure by Letters Patent, is—

1. The combination of a shaft having a longitudinal slot in its side, a member mounted on the shaft having a radial groove and a groove crossing the radial groove in its face, a key adapted to be received in the longitudinal slot in the shaft and the radial groove in the face of the member mounted thereon, and a spring extending out from the key and adapted to be sprung into the groove crossing the radial groove in the face of the member, substantially as described.

2. The combination of a bolt having a longitudinal slot in its threaded end, a nut having a radial groove and a groove crossing the radial groove in its outer face, a key adapted to be received in the slot in the bolt and the radial groove in the nut, and a spring extending out from the key and adapted to be sprung into the groove crossing the radial groove in the face of the nut, substantially as described.

3. The combination of a bolt having a longitudinal slot in its threaded end, a nut having a radial groove and a groove crossing the radial groove in its outer face, a key adapted to be received in the slot in the bolt and the radial groove in the nut and having an extending portion received into the slot in the bolt to a greater depth than the radial groove in the nut, and a spring extending out from the key and adapted to be sprung into the groove crossing the radial groove in the face of the nut, substantially as described.

WORTH E. CAYLOR.

Witnesses:
EPHRAIM BANNING,
THOMAS B. MCGREGOR.